(12) United States Patent
Zheng et al.

(10) Patent No.: US 12,443,649 B2
(45) Date of Patent: Oct. 14, 2025

(54) MULTIMEDIA FILE PLAYING METHOD AND APPARATUS FOR ROTATABLE DEVICE

(71) Applicant: SAMSUNG ELECTRONICS CO., LTD., Suwon-si (KR)

(72) Inventors: Xinjian Zheng, Nanjing (CN); Liang Ding, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/966,106

(22) Filed: Oct. 14, 2022

(65) Prior Publication Data

US 2023/0124474 A1  Apr. 20, 2023

Related U.S. Application Data

(63) Continuation of application No. PCT/KR2022/015384, filed on Oct. 12, 2022.

(30) Foreign Application Priority Data

Oct. 15, 2021 (CN) .......................... 202111204453.2

(51) Int. Cl.
*G06F 16/40* (2019.01)
*G06F 16/438* (2019.01)
(Continued)

(52) U.S. Cl.
CPC .............. *G06F 16/45* (2019.01); *G06F 16/40* (2019.01); *G06F 16/4393* (2019.01);
(Continued)

(58) Field of Classification Search
CPC ........... G06F 16/45; G06F 16/55; G06F 16/75
See application file for complete search history.

(56) References Cited

U.S. PATENT DOCUMENTS

| | | |
|---|---|---|
| 8,451,296 B2 | 5/2013 | Ono |
| 9,307,194 B2 | 4/2016 | Kim et al. |

(Continued)

FOREIGN PATENT DOCUMENTS

| | | |
|---|---|---|
| CN | 200991049 Y | 12/2007 |
| CN | 101996040 A | 3/2011 |

(Continued)

OTHER PUBLICATIONS

Chen, Jun-Cheng, et al. "Tiling slideshow." Proceedings of the 14th ACM international conference on Multimedia. 2006. (Year: 2006).*

(Continued)

*Primary Examiner* — Brittany N Allen
(74) *Attorney, Agent, or Firm* — Sughrue Mion, PLLC

(57) ABSTRACT

The present disclosure provides a multimedia file playing method and apparatus for a rotatable device. In some embodiments, the method includes grouping, in a level-by-level grouping manner and based on a specified grouping parameter sequence, files in a multimedia file library, to obtain a plurality of groups of files. Different parameters in the specified grouping parameter sequence correspond to different grouping granularities. The method further includes generating a sub file sequence for each height-width ratio type in each group of the plurality of groups of files. The height-width ratio type includes a horizontal screen type, a vertical screen type, and a square screen type. The method further includes generating and playing a file playing sequence according to a received file playing instruction, and based on sub file sequences of a corresponding group of the plurality of groups of files and a principle of minimum number of device rotations.

16 Claims, 7 Drawing Sheets

(51) Int. Cl.
*G06F 16/45* (2019.01)
*G06F 16/55* (2019.01)
*G06F 16/75* (2019.01)
*G06F 18/23* (2023.01)

(52) U.S. Cl.
CPC .............. *G06F 16/55* (2019.01); *G06F 16/75* (2019.01); *G06F 18/23* (2023.01)

(56) References Cited

U.S. PATENT DOCUMENTS

| | | | |
|---|---|---|---|
| 11,669,216 B2 | 6/2023 | Liu et al. | |
| 2010/0017418 A1 | 1/2010 | Gopalakrishnan et al. | |
| 2011/0032384 A1* | 2/2011 | Ono | H04N 1/00323 348/231.2 |
| 2012/0272126 A1* | 10/2012 | Atkins | G06F 16/40 715/202 |
| 2019/0012129 A1* | 1/2019 | Han | H04N 21/44218 |
| 2020/0242298 A1* | 7/2020 | Allen | G06F 40/103 |
| 2020/0286103 A1* | 9/2020 | Sullivan | G06Q 30/0201 |
| 2021/0173439 A1 | 6/2021 | Lee et al. | |
| 2021/0224015 A1 | 7/2021 | Choi et al. | |
| 2021/0250608 A1 | 8/2021 | Braness et al. | |
| 2021/0250627 A1 | 8/2021 | Soroushian | |
| 2021/0311592 A1 | 10/2021 | Liu et al. | |
| 2021/0319765 A1 | 10/2021 | Chee et al. | |

FOREIGN PATENT DOCUMENTS

| | | |
|---|---|---|
| CN | 102483746 A | 5/2012 |
| CN | 103116631 A | 5/2013 |
| CN | 103902162 A | 7/2014 |
| CN | 113163228 A | 7/2021 |
| KR | 10-2160038 B1 | 10/2020 |
| WO | 2017/115066 A1 | 7/2017 |
| WO | 2020/184798 A1 | 9/2020 |

OTHER PUBLICATIONS

Communication dated Jan. 18, 2023, issued by the International Searching Authority in counterpart International Application No. PCT/KR2022/015384 (PCT/ISA/220, PCT/ISA/210, and PCT/ISA/237).
Communication dated Sep. 19, 2024, issued by the European Patent Office in counterpart European Application No. 22881338.2.
Communication dated Mar. 13, 2025, issued by the China National Intellectual Property Administration in Chinese Application No. 202111204453.2.
Communication issued Jul. 2, 2025 by the European Patent Office in European Patent Application No. 22881338.2.

\* cited by examiner

MULTIMEDIA FILE PLAYING METHOD AND APPARATUS FOR ROTATABLE DEVICE

CROSS-REFERENCE TO RELATED APPLICATIONS

This application is a continuation application of International Application No. PCT/KR2022/015384, filed on Oct. 12, 2022, which claims priority to Chinese Patent Application 202111204453.2, filed on Oct. 15, 2021, in the China National Intellectual Property Administration, the disclosures of which are incorporated by reference herein in their entireties.

TECHNICAL FIELD

The present disclosure relates generally to multimedia playing technology, and in particular, to a multimedia file playing method and apparatus for a rotatable device.

BACKGROUND ART

With the popularity of smart phones and the development of mobile Internet, using mobile terminals to take photos and videos has become more and more common. These photos and videos may be stored locally, on a network disk, and/or uploaded to a network platform for sharing. When browsing these photos and videos, in order to obtain a better visual effect, a screen projection technology may be used to show contents on a large-screen device, or the contents may be stored and played directly on the large-screen device. Alternatively or additionally, a network disk client may be used for watching the contents on the large-screen device. In these photos and videos, both horizontal (e.g., landscape) and vertical (e.g., portrait) files may have a high proportion. Especially after the popularity of short video platforms like Tik Tok, people tend to take vertical videos or photos, which may place higher demands for traditional display devices. The emergence of rotatable screen devices, such as Samsung Sero TV, highlights this trend.

In related rotatable screen devices, when browsing photos or videos, a determination of whether to adjust the horizontal and vertical screen state (e.g., orientation) of a screen may be made according to the resolution of an image frame.

However, when using the related rotatable screen devices to browse photos or videos, problems such as frequent screen rotation and long browsing processing delay may exist due, at least in part to, one of the following reasons.

For example, the related rotatable screen devices may rotate according to the currently browsed content when used for browsing photos or videos. As such, when users browse a large number of photos or videos, frequent screen rotation may occur. In order to avoid frequent screen rotation, the related rotatable screen devices may, during browsing, sort the selected pictures according to a height-width ratio, and then play the selected pictures according to the sorted result. In this way, the screen may rotate less by uniformly playing files with consistent height-width ratios. However, when this simple sorting method is applied to browsing of a large number of files, the problem of high sorting cost may exist, which may lead to long browsing processing delay. Moreover, this browsing method may break the generation time sequence of files, thus failing to allow users to browse multimedia files according to the generation time of files (e.g., in chronological order).

SUMMARY

In view of the above-described problems with related rotatable screen devices, a purpose of the present disclosure is to provide a multimedia file playing method and apparatus, which may avoid frequent screen rotation and may improve playing efficiency.

In order to achieve the above purpose, the embodiments of the present disclosure adopt the following technical solutions.

According to an aspect of the disclosure, there is provided a multimedia file playing method for a rotatable device, the method includes grouping, in a level-by-level grouping manner and based on a specified grouping parameter sequence, files in a multimedia file library, to obtain a plurality of groups of files. Different parameters in the specified grouping parameter sequence correspond to different grouping granularities. The method further includes generating a sub file sequence for each height-width ratio type in each group of the plurality of groups of files. The height-width ratio type include a horizontal screen type, a vertical screen type, and asquare screen type. The method further includes generating and playing a file playing sequence, according to a received file playing instruction, and based on sub file sequences of a corresponding group of the plurality of groups of files and a minimum number of device rotations.

According to another aspect of the disclosure, there is provided a multimedia file playing apparatus for a rotatable device that includes a preprocessing unit and a playing unit.

In some embodiments, the preprocessing unit is configured to group files in a multimedia file library in a level-by-level grouping manner based on a specified grouping parameter sequence, and to generate a sub file sequence for each height-width ratio type for each group based on each group of files, wherein the height-width ratio type include horizontal screen, vertical screen and square screen, and different parameters in the specified grouping parameter sequence correspond to different grouping granularities; and In some embodiments, the playing unit is configured to generate and play a file playing sequence, when a file playing instruction is received, according to the file playing instruction based on the sub file sequences of a corresponding group in the multimedia file library and a minimum number of device rotations.

According to another aspect of the disclosure, there is provided a non-transitory computer readable storage medium, wherein the non-transitory computer readable storage medium stores instructions, when executed by a processor, cause the processor to execute the steps of the multimedia file playing method for the rotatable device as described above.

According to another aspect of the disclosure, there is provided an electronic device, comprising the non-transitory computer readable storage medium and a processor capable of accessing the non-transitory computer readable storage medium.

According to the multimedia file playing solution for the rotatable device provided by the embodiments of the present disclosure, the files in the multimedia file library are grouped based on different granularities by adopting the level-by-level grouping method in advance, and the sub file sequences of each height-width ratio type (including horizontal screen, vertical screen and square screen) in the corresponding group are generated for each group of files, so that when the file playing instruction is received, the file playing sequence is generated and played based on the sub file sequences of the corresponding group in the multimedia file library and the principle of minimum number of device rotations. In this way, the file playing sequence with a minimum number of device rotations may be used to avoid the problem of frequent screen rotations during playing. As a result, the efficiency of generating the file playing sequence based on the file playing instruction may be improved using the sub file sequences of each group generated level by level in advance.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

In order to make the object, technical solution and advantages of the present disclosure clearer, the present disclosure will be further described in detail with reference to the drawings and specific embodiments.

Figure 1:
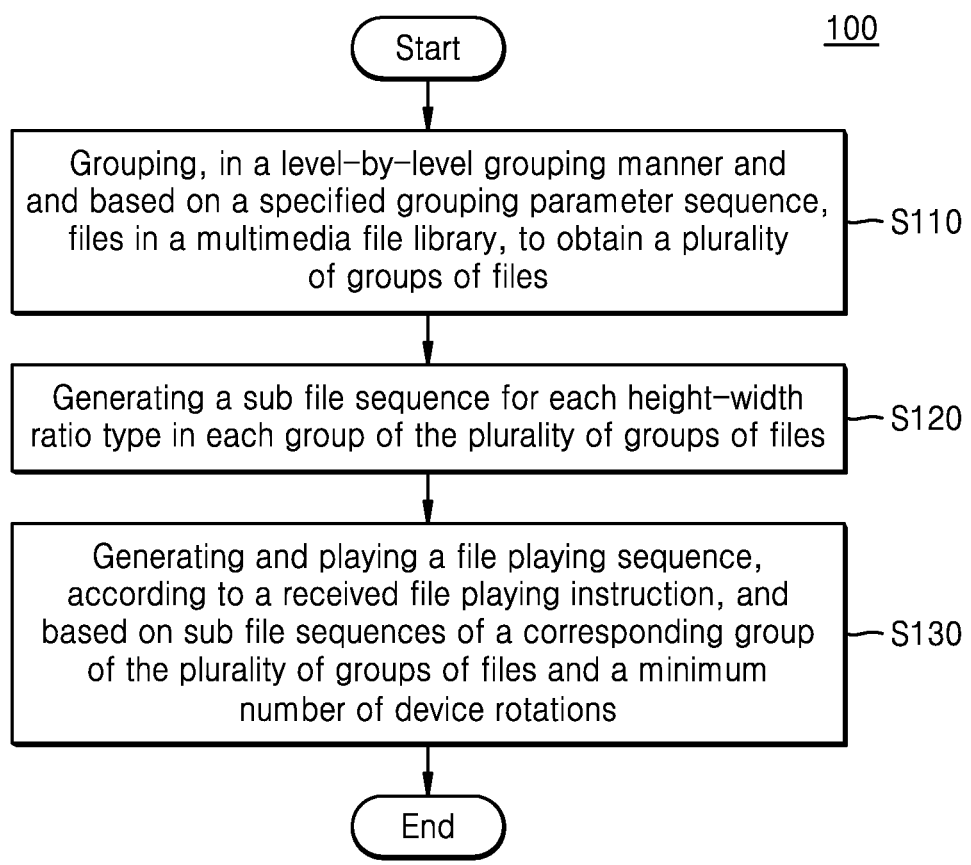
FIG. 1 is a flowchart illustrating a method according to various embodiments of the present disclosure.

FIG. 1 is a flowchart according to various embodiments of the present disclosure. As shown in FIG. 1, method 100 depicts a multimedia file playing method for a rotatable device realized according to various embodiments of the present disclosure.

In operation S110, files in a multimedia file library may be grouped in advance in a level-by-level grouping manner based on a specified grouping parameter sequence.

In this operation, the files in the multimedia file library may be grouped level by level according to specified grouping parameters.

In operation S120, a sub file sequence may be generated for each height-width ratio type in each group based on each group of files.

The height-width ratio types may include a horizontal screen, a vertical screen, and a square screen. In some embodiments, different parameters in the grouping parameter sequence may correspond to different grouping granularities.

The files in each group may be classified according to their height-width ratio types (e.g., horizontal screen, vertical screen, square screen). The sub file sequence for each height-width ratio type in the corresponding group may be obtained in advance.

In operation S130, a file playing sequence may be generated according to received file playing instruction, based on the sub file sequences of corresponding group of the plurality of groups of files and a minimum number of device rotations.

Such that when a file playing instruction is received, a playing sequence may be generated rapidly using the sub file sequences generated in advance for groups within a corresponding playing file range, thereby improving playing efficiency.

The grouping parameter sequence may be used to define a specific grouping parameter set and an order for the level by level grouping. In some embodiments, the grouping parameter sequence may be set according to actual requirements. For example, the grouping parameter sequence may be set as a sequence consisting of day, week, month and year. Alternatively or additionally, the grouping parameter sequence may be set as a sequence consisting of "user preference value" and "day". However, the setting of the grouping parameter sequence is not limited to the above examples. In practical application, multiple grouping parameter sequences may be set according to different requirements, and for each grouping parameter sequence, corresponding grouping data may be generated according to operation S110.

In some embodiments, in order to quickly realize level-by-level grouping, the grouping parameter sequence may be generated based on an ascending order of the grouping granularities. That is, the grouping parameter sequence may be generated according to the order of the grouping granularities from small to large. Therefore, for second and above-level grouping, grouping results of an adjacent level can be utilized, thereby improving the efficiency of the level by level grouping.

In the present disclosure, a file having a height-width ratio type of horizontal screen may refer to a file having a height-width ratio that is greater than 1, a file having a height-width ratio type of vertical screen may refer to a file having a height-width ratio that is less than 1, and a file having a height-width ratio type of square screen may refer to a file having a height-width ratio that is equal to 1. It should be noted that considering that the square screen may be suitable for the horizontal screen and the vertical screen, in order to facilitate the generation of sequences with fewer rotations, it may be necessary to screen out square screen files separately, so as to combine the playing sequences subsequently based on different types of sub file sequences.

In practical applications, in order to ensure the accuracy of grouping data in the multimedia file library, the grouping data in the multimedia file library may be updated based on operation S110 periodically and/or when the content of multimedia file library changes (e.g., adding files, deleting files, modifying files).

In some embodiments, the multimedia file library may comprise an album in a user device and/or a multimedia file library in a server. However, the present disclosure is not limited in this regard in practical application.

In some embodiments, in operation S120, the generating of a sub file sequence for each height-width ratio type in each group of files may include traversing each grouping parameter $S_n$ the grouping parameter sequence in turn, and grouping the files in the multimedia file library based on the grouping parameters $S_n$.

If or when, in operation S110, the grouping parameter $S_1$, is the first grouping parameter $S_1$, the grouping of the files in the multimedia file library may include grouping, according to the grouping parameter $S_1$, the files to obtain level 1 groups. Operation S110 may also include, for each level 1 group, classifying the files in the level 1 group according to the height-width ratio types of the files in the group, sorting the files of the same type, and obtaining the sub file sequence for each height-width ratio type based on the sorting.

If or when, in operation S110, the grouping parameter $S_n$ is the second or later grouping parameter, the grouping of the files in the multimedia file library may include grouping all level n-1 groups based on the grouping parameter $S_n$ to obtain level n groups. Operation S120 may also include, for each level n group, based on the sub file sequences of all the level n-1 groups in the level n group, obtaining the sub file sequence for respective height-width ratio type in the level n group in a manner of concatenating sub file sequences of the same type.

As described above, groups with different granularities may be generated level by level from a first grouping parameter in the grouping parameter sequence, and corresponding sub file sequences may be generated.

Assuming that the grouping parameter sequence is "day, week and month", according to the above level-by-level grouping method, firstly, the files in the multimedia file library may grouped by day, and the files of each day may be classified and sorted according to their height-width ratio types to obtain a horizontal screen sub file sequence, a vertical screen sub file sequence and/or a square screen sub file sequence for each day. Second, based on results of grouping by day, the files in the multimedia file library are grouped by week, and based on all sub file sequences of days included in each week, sub file sequences of each week are obtained. Third, based on results of grouping by week, the files in the multimedia file library are grouped by month, and sub file sequences of each month may be obtained based on all sub file sequences of weeks included in each month.

In some embodiments, in order to further improve the generation efficiency of the playing sequence, when the files in the multimedia file library are grouped in advance in the level-by-level grouping manner, a first advanced candidate sequence and a second advanced candidate sequence may be further generated for each group, as described in further detail in reference to steps x1 through x4.

In step x1, a primary candidate sequence set of respective group may be obtained by arranging the sub file sequences of each group of files according to a preset sub-sequence sorting mode, when the files in the multimedia file library are grouped in advance in the level-by-level grouping manner.

In some embodiments, the sub-sequence sorting mode may include, when a group contains three sub file sequences, after a full permutation of the square screen sub file sequence and the horizontal screen sub file sequence in the group, concatenating each full permutation result with the vertical screen state sequence in the group to obtain horizontal screen state sequences in the primary candidate sequence set for the group. Alternatively or additionally, the sub-sequence sorting mode may further include, after a full permutation of the vertical screen sub file sequence and the square screen sub file sequence in the group, concatenating each full permutation result with the horizontal screen state sequence in the group to obtain vertical screen state sequences in the primary candidate sequence set for the group;

The sub-sequence sorting mode may further include, when the group only contains two sub file sequences, performing full permutation on the two sub file sequences to obtain the horizontal screen state sequences or the vertical screen state sequences in the primary candidate sequence set of the group. If or when the group contains a square screen sub file sequence, then a screen state corresponding to each full permutation result is the height-width ratio type of the non-square screen sub file sequence. Otherwise, the screen state corresponding to each full permutation result is the height-width ratio type of the first sub file sequence.

The sub-sequence sorting mode may further include, when the group contains only one sub file sequence, taking the sub file sequence as a unique sequence member in the primary candidate sequence set of the group. If or when the sequence in the primary candidate sequence set is a square screen sub file sequence, the sequence belongs to both the horizontal screen state sequence and the vertical screen state sequence. Otherwise, the screen state corresponding to the sequence is the height-width ratio type of sub file sequence.

Based on the sub-sequence sorting mode described above, the primary candidate sequence set of each group may be obtained, which may contain the horizontal screen state sequence and/or the vertical screen state sequence. The horizontal screen state sequence and the vertical screen state sequence which may be specifically included in the primary candidate sequence set and corresponding numbers of device rotations are shown in Table 1 below.

TABLE 1

| Horizontal Screen | | Vertical Screen | |
|---|---|---|---|
| Sequence | Number of Rotations | Sequence | Number of Rotations |
| Sub1→Sub2→Sub3 | 1 | Sub3→Sub2→Sub1 | 1 |
| Sub2→Sub1→Sub3 | 1 | Sub2→Sub3→Sub1 | 1 |
| Sub1→Sub3 | 1 | Sub3→Sub1 | 1 |
| Sub1→Sub2 | 0 | Sub2→Sub1 | 1 |
| Sub2→Sub1 | 0 | Sub2→Sub3 | 0 |
| Sub2→Sub3 | 1 | Sub3→Sub2 | 0 |
| Sub3 | 1 | Sub3 | 0 |
| Sub2 | 0 | Sub2 | 0 |
| Sub1 | 0 | Sub1 | 1 |

In the above Table 1, Sub1 represents the horizontal screen sub file sequence, Sub2 represents the square screen sub file sequence, and Sub3 represents the vertical screen sub file sequence. As shown in Table 1, the number of rotations of each sequence in the primary candidate sequence set is at most 1.

Figure 2:
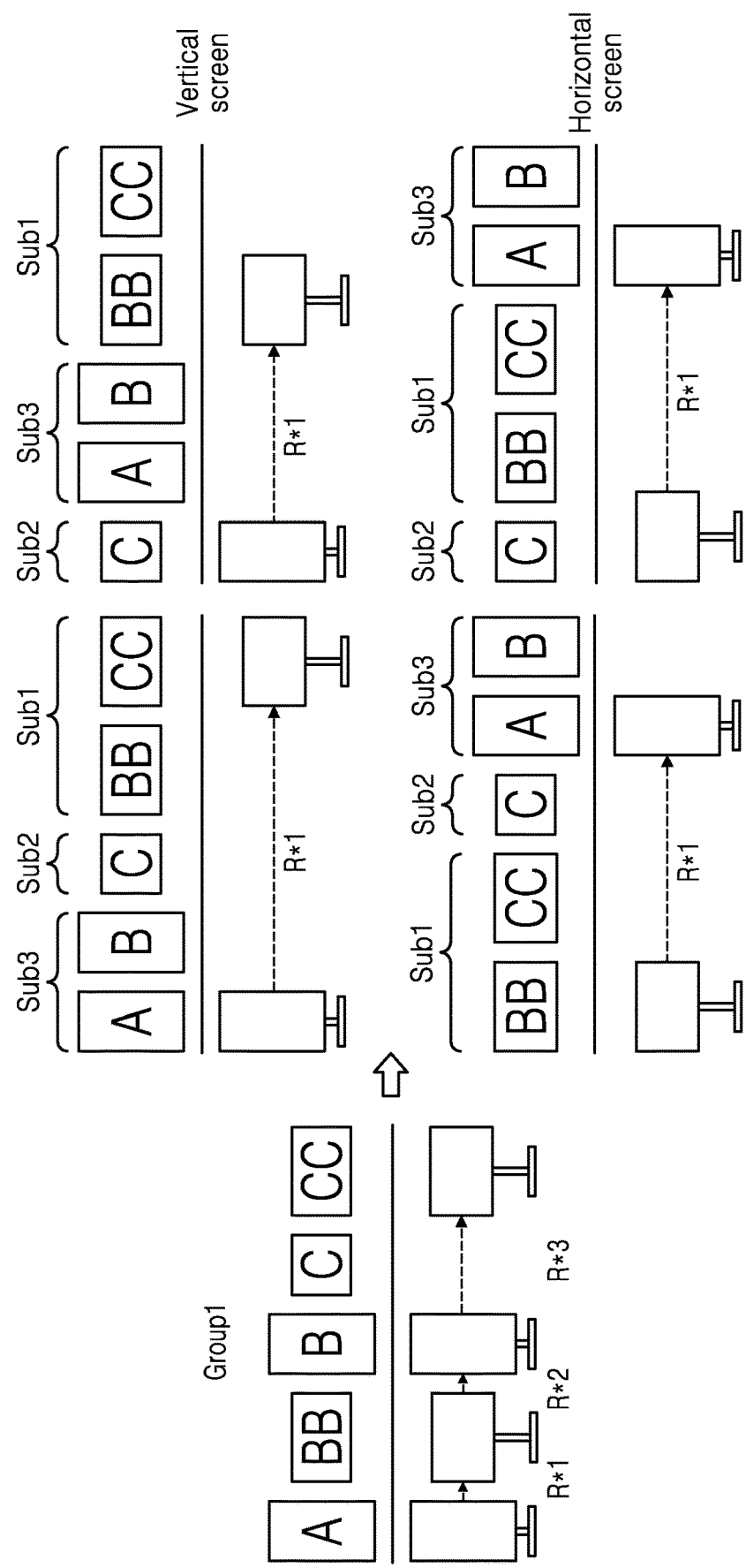
FIG. 2 is a schematic diagram illustrating an effect of a sub-sequence sorting mode according to various embodiments of the present disclosure.

In some embodiments, the implementation of the sub-sequence sorting mode may be exemplified by the process shown in FIG. 2. As shown in FIG. 2, a group Group1 may contain files with three types of height-width ratios, such as, files BB and CC with a horizontal screen type, file C with a square screen type, and files A and B with a vertical screen type. Playing the Group1 files in their current order may result in three screen rotations (e.g., R*1, R*2, and R*3).

As described above in reference to the sub-sequence sorting mode, the group Group1 may be sequenced into three sub file sequences, namely Sub1 (e.g., files BB and CC), Sub2 (e.g., file C), and Sub3 (e.g., files A and B), and four sequences may be obtained, in which only one rotation (e.g., R*1) is needed to play the sequence. For example, the four sequences may comprise two vertical screen state sequences, as shown in the upper row on the right side of FIG. 2 and described in Table2, and two horizontal screen state sequences, as shown in the lower row on the right side of FIG. 2 and described in Table 2 below.

TABLE 2

| Horizontal Screen Sequence | Vertical Screen Sequence |
| --- | --- |
| Sub1→Sub2→Sub3 | Sub3→Sub2→Sub1 |
| Sub2→Sub1→Sub3 | Sub2→Sub3→Sub1 |

In step x2, the method 100 may include, for each level n group $G_{n,i}$, generating a first advanced candidate sequence for the group $G_{n,i}$ in each screen state according to the principle of minimum number of device rotations based on the primary candidate sequence sets of all the level n−1 groups in the group $G_{n,i}$, where n is greater than 1.

In this step, for second and later level groups $G_{n,i}$, the first advanced candidate sequence of the group $G_{n,i}$ may be generated based on the primary candidate sequence set of corresponding lower level groups according to the principle of minimum number of device rotations, so that the first advanced candidate sequence of the level n group $G_{n,i}$ may satisfy the sequence of the level n−1 groups within the group.

In some embodiments, the following exemplary method may be adopted in step x2 to generate the first advanced candidate sequence of the group $G_{n,i}$ in each screen state according to the principle of minimum number of device rotations.

The exemplary method may include, for each screen state $T_i$, taking this screen state $T_i$ as a current screen state, and traversing the level n−1 groups in the group $G_{n,i}$. The method may further include selecting a sequence matching the current screen state from the primary candidate sequence sets of each level n−1 group traversed. The method may further include determining a screen state after playing the selected sequence in the current screen state. The method may further include updating the current screen state to the currently determined screen state. The method may further include sequentially concatenating all the selected sequences to obtain the first advanced candidate sequence of the group $G_{n,i}$ in the screen state $T_i$.

In step x3, the method 100 may include, for each level 2 group $G_{2,i}$, taking all the level 1 groups in the group $G_{2,i}$ as target sorting groups for multi-grouping sorting. Step x3 may further include obtaining a prioritized play sequence of the group $G_{2,i}$ in each screen state according to a preset multi-grouping sorting mode based on the sub file sequences of the target sorting group. Step x3 may further include taking the prioritized play sequence as a second advanced candidate sequence of the group $G_{2,i}$ in the corresponding screen state.

In some embodiments, the multi-grouping sorting mode may be realized as described in further detail in reference to steps r1 through r4.

In step r1, the multi-grouping sorting mode may include, for each target sorting group for multi-grouping sorting, arranging all the sub file sequences of the target sorting group according to a preset sub-sequence sorting mode to obtain a primary candidate sequence set of the target sorting group.

The specific implementation method of this step may be the same as that described in step x1 above, and may not be repeated here for brevity.

Alternatively or additionally, if or when the primary candidate sequence set of the target sorting group has been generated in advance, there may be no need to generate the primary candidate sequence set for the target sorting group in step r1.

In step r2, the multi-grouping sorting mode may include constructing a sequence relation network based on the primary candidate sequence sets of all the target sorting groups.

A node in the sequence relation network may represent a sequence in the primary candidate sequence set. The weight of the node may be the number of device rotations required when playing a sequence to which the node belongs. Each node may be connected with all the nodes corresponding to adjacent target sorting groups of the target sorting group to which the node belongs. A path weight between adjacent nodes may represent the number of device rotations required for playing switching between corresponding sequences.

In step r3, the multi-grouping sorting mode may include traversing each sequence in the primary candidate sequence set of the target sorting group with a smallest sequence index. The multi-grouping sorting mode may further include selecting a path with a smallest total path weight as a superior path corresponding to the sequence from all paths in the sequence relation network starting from the sequence and ending at node of the target sorting group with a largest sequence index. The total path weight may be the sum of the weights of all the nodes in the path and all the node paths.

The multi-grouping sorting mode may include, in step r4, based on the superior path, determining a path with the minimum number of device rotations in each screen state. The multi-grouping sorting mode may further include obtaining a priority playing sequence in the corresponding screen state.

As described above in reference to the multi-grouping sorting mode, the priority playing sequence in each screen state may be obtained based on a shortest path, and the size of the path may be determined by the number of device rotations, so that the number of device rotations corresponding to the priority playing sequence in each screen state may be minimized.

The method 100 may include in step x4, for each level k group $G_{k,i}$, generating a second advanced candidate sequence in each screen state for the group $G_{k,i}$ according to the principle of minimum number of device rotations based on the second advanced candidate sequences of all the level k−1 groups in the group where k is greater than 2.

That is, step x4 may be used to generate the second advanced candidate sequence in each screen state (including horizontal screen and vertical screen) for third and later-level groups.

In some embodiments, the following exemplary method may be adopted in step x4 to generate the second advanced candidate sequence in each screen state for the group $G_{k,i}$ according to the principle of minimum number of device rotations.

The example method may include, for each screen state $T_i$, taking this screen state $T_i$ as a current screen state, and traversing the level k−1 groups in the group $G_{k,i}$, for each level k−1 group being traversed. The example method may further include selecting a sequence matching the current screen state from the second advanced candidate sequence of the level k−1 group. The example method may further include determining a screen state after playing the selected sequence in the current screen state. The example method may further include updating the current screen state to the currently determined screen state. The example method may further include sequentially concatenating all the selected sequences to obtain the second advanced candidate sequence in the screen state $T_i$ for the group $G_{k,i}$.

In the exemplary method described above, considering that the screen state may change after the sequence of each group is played, after selecting a sequence, it may be necessary to determine the screen state after the selected sequence has been played in the current screen state, so as to select the sequence of the next group based on the screen state. Thus, attempting to minimize the number of device rotations of the second advanced candidate sequence obtained by concatenating all the selected sequences.

It should be noted that since the second advanced candidate sequence of groups at each level is generated based on the second advanced candidate sequences of groups of the lower level contained therein, and the second advanced candidate sequence of the level 2 group is generated based on the sub file sequences of the level 1 groups contained therein, the second advanced candidate sequence of the level 2 group may ensure the order of the level 1 groups in the group, so the second advanced candidate sequence of the group at each level may ensure the order of the level 1 groups in the group. In this way, during subsequent file playing, if the level 1 group sequence needs to be ensured, the second-level advanced candidate sequence may be considered to be used for generating the file playing sequence.

In practical applications, there is no requirement for the execution order of step x2 for generating the first advanced candidate sequence and steps x3 and x4 for generating the second advanced candidate sequence, that is, steps x3 and x4 may be executed before step x2 or simultaneously with step x2.

Returning to FIG. 1, in operation 102, if or when a file playing instruction is received, a file playing sequence may be generated according to the file playing instruction and played based on the sub file sequences of the corresponding group in the multimedia file library and the principle of minimum number of the device rotations.

That is, operation 102 may be used to generate the file playing sequence based on the pre-generated sub file sequences according to the principle of minimum number of device rotations. In this way, the number of rotations of a display device during playing may be reduced, and the efficiency for generating the file playing sequence may be improved, so that the playing cost is reduced.

In some embodiments, when only the corresponding sub file sequences are generated for each group in operation 101, the file playing sequence may be generated in operation 102 as follows according to whether there is a specified sorting requirement in the playing instruction.

Situation 1. If or when the file playing instruction does not contain a playing sequence condition related to the grouping parameter, based on the sub file sequences of level $n_{max}$ and lower level groups within a file playing range indicated by the file playing instruction, the file playing sequence may be generated by generating a sub file sequence corresponding to the file playing range in a manner of concatenating sub file sequences of the same type, and arranging the generated sub file sequences in a manner that the sub file sequences whose height-width ratio types match the current screen state are preferentially placed in the front to obtain the file playing sequence, where $n_{max}$ is the highest grouping level corresponding to a complete group contained in the file playing range.

Here, when the file playing instruction does not contain a playing sequence condition related to the grouping parameter, based on the sub file sequences of level $n_{max}$ and lower level groups in a file playing range indicated by the instruction, a sub file sequence corresponding to the file playing range is generated in a manner of concatenating sub file sequences of the same type; and then the generated sub file sequences are arranged in a manner that the sub file sequences whose height-width ratio types match the current screen state are preferentially placed in the front of the sequence to obtain the file playing sequence. In this way, the number of device rotations corresponding to the finally obtained file playing sequence may be at most 1, so that the problem of frequent device rotation during playing may be avoided.

In some embodiments, the following method may be adopted to generate a sub file sequence corresponding to the file playing range in a manner of concatenating sub file sequences of the same type based on the sub file sequences of level $n_{max}$ and lower level groups within the file playing range indicated by the file playing instruction.

If or when incomplete level $n_{max}$ group exists in the file playing range, for each incomplete level $n_{max}$ group, based on the sub file sequences of level $n_{max-i}$ groups contained in the level $n_{max}$ group in the file playing range, the sub file sequence may be generated by generating a sub file sequence corresponding to the level $n_{max}$ group in the file playing range in a manner of concatenating sub file sequences of the same type, where $n_{max-i}$ is the highest grouping level of complete same-level groups constituting the incomplete $n_{max}$ level group.

Alternatively or additionally, based on the sub file sequences of all level $n_{max}$ groups in the file playing range, the sub file sequence may be generated by generating a sub file sequence for each height-width ratio type in the file playing range in a manner of concatenating sub file sequences of the same type.

In the above method, considering that a corresponding sub file sequence has not been generated in advance for the incomplete level $n_{max}$ group, it may be necessary to generate a corresponding sub file sequence of each height-width ratio type for each incomplete level $n_{max}$ group first, so that integration with the sub file sequences of other complete level $n_{max}$ groups in the file playing range is realized to obtain the sub file sequence of each height-width ratio type in the file playing range.

Situation 2. When the file playing instruction contains the playing sequence condition related to the grouping parameter, based on the sub file sequences of level $n_{min}$ and lower level groups in the file playing range, generating a file playing sequence with the minimum number of device rotations in the current screen state according to the multi-grouping sorting mode, where $n_{min}$ is a lowest grouping level corresponding to the grouping parameter indicated by the playing sequence condition.

Here, when the file playing instruction contains the playing sequence condition related to the grouping parameter, a file playing sequence with the minimum number of device rotations in the current screen state is generated based on the sub file sequences of level $n_{min}$ and lower level groups in the file playing range indicated by the instruction according to the multi-grouping sorting mode. In this way, not only the playing sequence requirement of the instruction may be met, but also the number of device rotations may be reduced, so that the problem of frequent rotation of the display device during playing may be avoided.

In some embodiments, specifically, the following method may be adopted to generate the file playing sequence with the minimum number of device rotations in the current screen state based on the sub file sequences of level $n_{min}$ and lower level groups in the file playing range according to the multi-grouping sorting mode.

If or when there exists an incomplete level $n_{min}$ group in the file playing range, for each incomplete level $n_{min}$ group, based on the sub file sequences of level $n_{min-i}$ groups contained in the $n_{min}$ level group in the file playing range, generating of the file playing sequence may include generating a sub file sequence corresponding to the level $n_{min}$ group in the file playing range in a manner of concatenating sub file sequences of the same type, where the $n_{min-i}$ is the highest grouping level of complete same-level groups constituting the incomplete $n_{min}$ level group.

The generating of the file playing sequence may further include taking all level $n_{min}$ groups in the file playing range as target sorting groups for multi-grouping sorting. The generating of the file playing sequence may further include obtaining a priority playing sequence in each screen state based on the sub file sequences of the target sorting groups according to the multi-grouping sorting mode. The generating of the file playing sequence may further include taking the priority playing sequence matching the current screen state as the file playing sequence.

The specific implementation of the multi-grouping sorting mode described in this method may be the same as above, and may not be repeated here for brevity.

In some embodiments, when the first advanced candidate sequence and the second advanced candidate sequence are generated for the second and later-level groups in operation 101, in operation 102, the file playing sequence may be generated by the following method according to whether there is a specified sorting requirement in the playing instruction.

Situation 1: When the file playing instruction does not contain the playing sequence condition related to the grouping parameter, based on the sub file sequences of level $n_{max}$ and lower level groups in a file playing range indicated by the file playing instruction, the file playing sequence may be generated by generating sub file sequences corresponding to the file playing range in a manner of concatenating sub file sequences of the same type, and arranging the generated sub file sequences in a manner that the sub file sequences whose height-width ratio types match the current screen state are preferentially placed in the front of the sequence to obtain the file playing sequence, where $n_{max}$ is the highest grouping level corresponding to a complete group contained in the file playing range.

The specific implementation of this step may be similar as that of the first file playing sequence generation method proposed above, and may not be repeated here for brevity.

Situation 2: When the file playing instruction contains the playing sequence condition related to the grouping parameter, the file playing sequence may be generated by performing steps y1 and y2 as described below.

Step y1 may include determining a lowest grouping level $n_{min}$ corresponding to the grouping parameter indicated by the playing sequence condition.

This step may be used to determine the sorting requirement of a lowest level indicated by the file playing instruction, so as to select an appropriate method for generating the playing sequence in the subsequent steps. For example, if or when the playing instruction requires sorting by day and "day" is a first level grouping parameter, then $n_{min}=1$. For another example, if or when the playing instruction requires sorting by month and "month" is a third-level grouping parameter, then $n_{min}=3$.

Step y2 may include when $n_{min}=1$, searching for a highest grouping level $n_{z,max}$ at which the file playing range is composed of complete same-level groups. If or when the search is successful and $n_{z,max}>1$, the file playing sequence may be generated by generating a file playing sequence for the current screen state according to the principle of minimum number of device rotations based on the second advanced candidate sequences of all level $n_{z,max}$ groups in the file playing range. Otherwise, taking level 1 groups in the file playing range as the target sorting groups of multi-grouping sorting, obtaining a prioritized playing sequence in each screen state based on the sub file sequences of the target sorting groups according to the multi-grouping sorting mode, and taking the prioritized playing sequence matching the current screen state as the file playing sequence.

Here, when $n_{min}=1$, it means that according to the file playing instruction, the generated file playing sequence needs to guarantee the order of level 1 groups. For example, if or when the playing instruction requires sorting by days, and "day" is the first level grouping parameter, then the generated file playing sequence needs to meet the order of "days". In this case, considering that the second advanced candidate sequence may satisfy the order of level 1 groups, the file playing sequence may be generated by searching for the second advanced candidate sequence of each group within the range. In this way, the file playing sequence may meet the sequence of first level grouping and the requirement for fewer number of device rotations, and the second advanced candidate sequence generated in advance may be used to improve the generating efficiency of the file playing sequence.

In some embodiments, the following exemplary method may be adopted to generate the file playing sequence for the current screen state according to the principle of minimum number of device rotations based on the second advanced candidate sequences of all level $n_{z,max}$ groups within the file playing range.

The exemplary method may include traversing all the level $n_{z,max}$ groups within the file playing range. The exemplary method may further include, for each level $n_{z,max}$ group being traversed, selecting a sequence matching the current screen state from the second advanced candidate sequences of the level $n_{z,max}$ group. The exemplary method may further include determining a screen state after playing the selected sequence in the current screen state. The exemplary method may further include updating the current screen state to the currently determined screen state. The exemplary method may further include sequentially concatenating all the selected sequences to obtain the file playing sequence.

When $n_{min}>1$, determining whether the file playing range may be composed of complete level $n_{min}+1$ groups, If so, generating a file playing sequence for the current screen state may be based on the first advanced candidate sequences of all the level $n_{min}+1$ groups within the file playing range according to the principle of minimum number of device rotations. Otherwise, generating a file playing sequence with the minimum number of device rotations for the current screen state may be based on the sub file sequences of level $n_{min}$ and lower level groups within the file playing range according to the multi-grouping sorting mode.

Here, when $n_{min}>1$, it means that according to the file playing instruction, the generated file playing sequence needs to guarantee order of the second and later levels groups. For example, if the playing instruction requires sorting by months, and "month" is a third-level grouping parameter, then the generated file playing sequence needs to meet the order of "months".

In the above method, considering that the first advanced candidate sequence may meet the order of corresponding next-level groups, when $n_{min}>1$, if it is determined that the file playing range is composed of complete level $n_{min}+1$ groups, the file playing sequence may be directly generated using the first advanced candidate sequences of the level $n_{min}+1$ groups within the playing range.

In some embodiments, the following exemplary method may be adopted to generate the file playing sequence for the current screen state according to the principle of minimum number of device rotations based on the first advanced candidate sequences of all level $n_{min}+1$ groups within the file playing range.

The exemplary method may include traversing all the level $n_{min}+1$ groups within the file playing range. The exemplary method may further include, for each level $n_{min}+1$ group being traversed, selecting a sequence matching the current screen state from the first advanced candidate sequences of the level $n_{min}+1$ group. The exemplary method may further include determining a screen state after playing the selected sequence in the current screen state. The exemplary method may further include updating the current screen state to the currently determined screen state. The exemplary method may further include sequentially concatenating all the selected sequences to obtain the file playing sequence.

In the above method, when $n_{min}>1$, if it is determined that the file playing range is not composed of complete level $n_{min}+1$ groups, it may be necessary to generate the file playing sequence with the minimum number of device rotations for the current screen state based on the sub file sequences of level $n_{min}$ and lower level groups within the file playing range according to the multi-grouping sorting mode. The method may be similar to the exemplary method described above.

Combined with several application examples, the implementation of the above method embodiments is schematically explained below.

Figure 3:
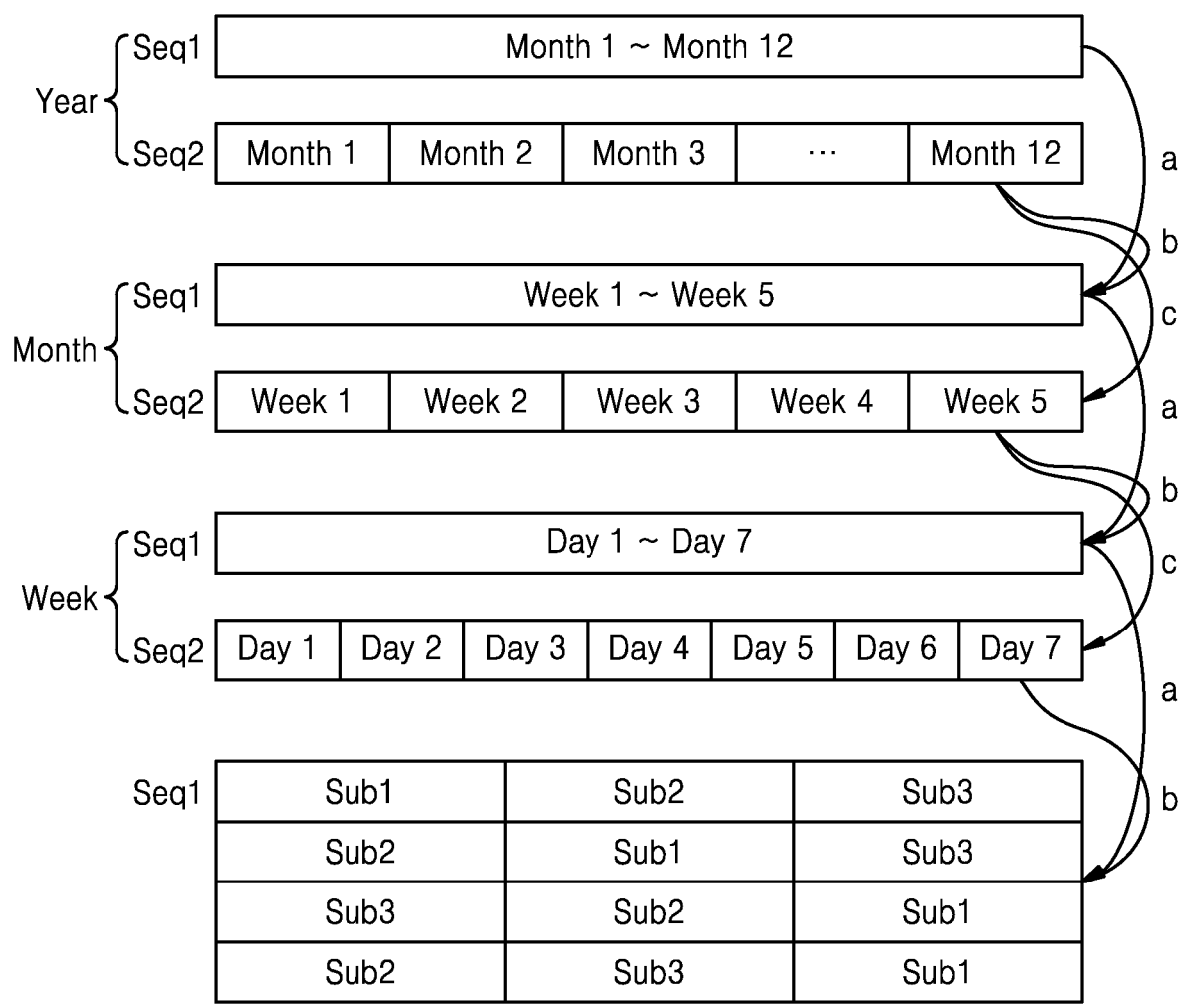
FIG. 3 is a schematic diagram illustrating file grouping in Example 1 according to various embodiments of the present disclosure.

Example 1: Organize and Play Files According to Height-Width Ratio and Time (1) perform file grouping in advance According to the grouping parameter sequence (e.g., a sequence consisting of day, week, month and year), the files in the multimedia file library are grouped level by level, and four levels of grouped files are obtained. FIG. 3 is a schematic diagram illustrating the grouping of this example, which schematically shows a file organization structure of one group in each level, where Seq1 represents the primary candidate sequence set and Seq2 represents the first advanced candidate sequence set. As shown in FIG. 3, first, the files in the multimedia file library are grouped at the first level (e.g., "day"). After grouping the files by days, the "day" where the files are located is recorded. Then, for the group corresponding to each day, the files in the group are classified according to their height-width ratio types to obtain the sub file sequences of the group, such as Sub1, Sub2, and Sub3. Then, sorting these sub file sequences to obtain the primary candidate sequence set (e.g., Seq1) for this group of four sequences, namely Sub1→Sub2→Sub3, Sub2→Sub1→Sub3, Sub3→Sub2→Sub1, and Sub2→Sub3→Sub1.

After the first-level grouping is completed, the files are subjected to second-level grouping by "week". The files in the multimedia file library are grouped by "week", and the "week" where the files are located is recorded. Then, based on the sub file sequences and primary candidate sequence sets of each day obtained by the first-level grouping, the groups corresponding to each week are sorted to obtain the primary candidate sequence set (Seq1) and the first advanced candidate sequence set (Seq2) of the group corresponding to each week.

After the second-level grouping is completed, the files are subjected to third-level grouping by "month". The files in the multimedia file library are grouped by "month", and the "month" where the files are located is recorded. Then, based on the sub file sequences and primary candidate sequence sets of each week obtained by the second-level grouping, the groups corresponding to each month are sorted to obtain the primary candidate sequence set (Seq1) and the first advanced candidate sequence set (Seq2) of the group corresponding to each month.

After the third-level grouping is completed, the files are subjected to fourth-level grouping by "year". The files in the multimedia file library are grouped by "year", and the "year" where the files are located is recorded. Then, based on the sub file sequences and primary candidate sequence sets of each month obtained by the third-level grouping, the groups corresponding to each year are sorted to obtain the primary candidate sequence set (Seq1) and the first advanced candidate sequence set (Seq2) of the group corresponding to each year.

(2) When the user selects videos and photos within a time period for automatic playing, the pre-established file sequences corresponding to grouping at each level may be used for browsing.

For example, when the user does not care about the shooting time (e.g., a timestamp indicating when the video or photo was taken or captured), the sequences in the primary candidate sequence set may be used for browsing, and only one time of rotation may be required.

As another example, when the user cares about the shooting time and the rotatable device needs to sort and browse the videos and photos in the specified time period according to the time parameters such as week, month and day, the sub file sequences and/or sequences in the first advanced candidate sequence set described above may be used to minimize the number of rotations.

Figure 4:
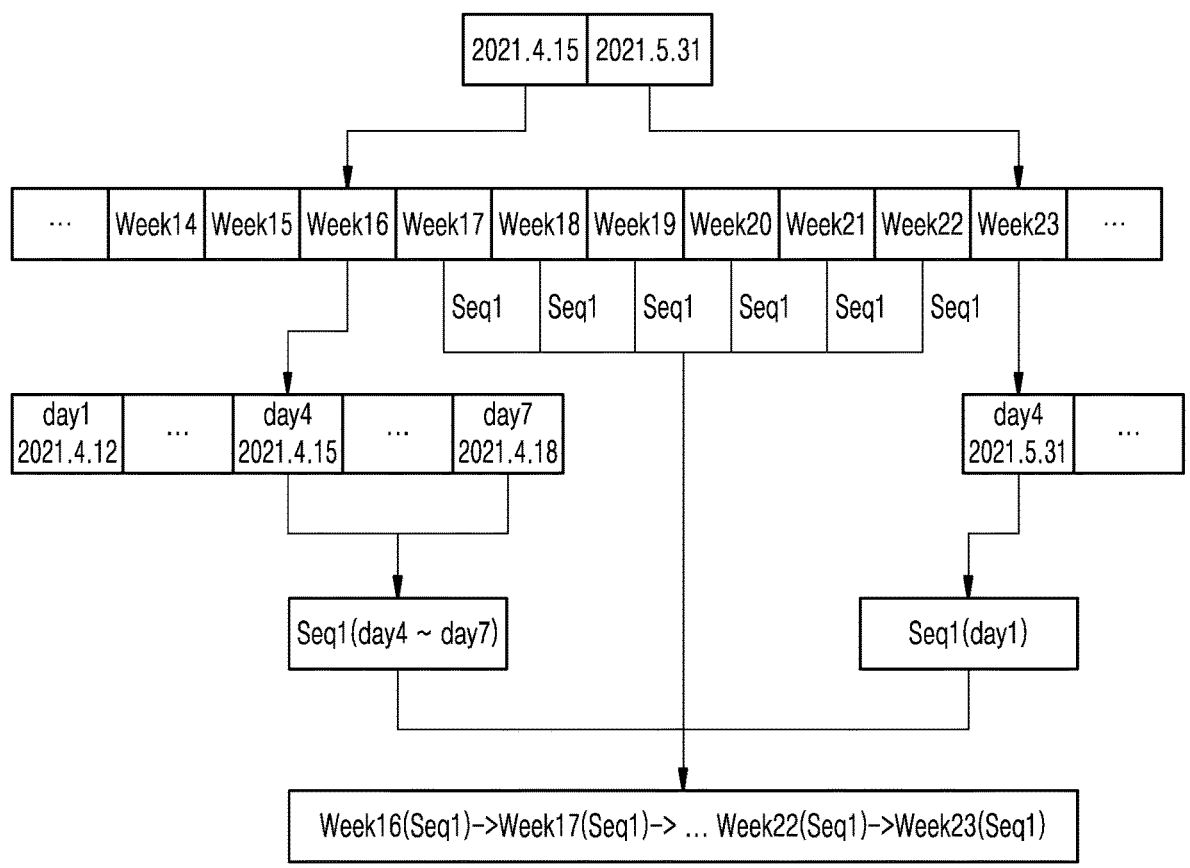
FIG. 4 is a schematic diagram illustrating generation of browsing sequence in Example 1 according to various embodiments of the present disclosure.

For example, when the user requests to browse the files within the time range starting on Apr. 15, 2021 and ending on May 31, 2021 in the order of weeks, a browsing sequence may be generated according to the flow shown in FIG. 4. As shown in FIG. 4, the period from Apr. 15, 2021 to May 31, 2021 includes the files from the $15^{th}$ week to the $23^{rd}$ week (e.g., week $15^{th}$ week 23 in FIG. 4), in which the $15^{th}$ week and the $23^{rd}$ week are incomplete weeks. That is, for the $15^{th}$ week, only Thursday to Sunday are included, and for the $23^{rd}$ week, only Monday is included.

During the generation of the browsing sequence, it may be necessary to generate sub file sequences for the incomplete week 15 and week 23. Specifically, the sub file sequence corresponding to the $15^{th}$ week in the time range from Apr. 15, 2021 to May 31, 2021 may be generated using the sub file sequence of each day from Apr. 15, 2021 to Apr. 18, 2021 in a manner of concatenating sub file sequences of the same type. However, the $23^{rd}$ week has only one day falling within the time range from Apr. 15, 2021 to May 31, 2021 (i.e., May 31, 2021), so the sub file sequence corresponding to May 31, 2021 is the sub file sequence of the $23^{rd}$ week within the time range from April 15 to May 31, 2021.

Then, primary candidate sequence sets are generated for the incomplete week 15 and week 23 respectively. Finally, based on the respective primary candidate sequence sets from the $15^{th}$ week to the $23^{rd}$ week, the file playing sequence matching the current screen state may be obtained according to the multi-grouping sorting mode.

For another example, when the user browses files in the time range from Apr. 15, 2021 to May 31, 2021, regardless of the shooting time, the process of generating the corresponding browsing sequence may be as described in the following paragraphs.

Since the time range from Apr. 15, 2021 to May 31, 2021 includes the whole May, the sub file sequence of May 2021 may be obtained directly.

For the incomplete April 2021, the sub file sequence corresponding to the part of April falling within the time range from Apr. 15, 2021 to May 31, 2021 may be generated using the sub file sequences of each day in April in a manner of concatenating sub file sequences of the same type. Alternatively, the sub file sequence corresponding to the part of April falling within the time range from Apr. 15, 2021 to May 31, 2021 may be generated using the sub file sequences of complete weeks (i.e. the $17^{th}$ week and $18^{th}$ week in FIG. 4) and the sub file sequences of each day in incomplete weeks (the $16^{th}$ week in FIG. 4) in a manner of concatenating sub file sequences of the same type.

Example 2: Organize and Play Files According to Height-Width Ratio, Time and Preference Degree For short video service platforms which are capable of recommending contents to users according to their characteristics, horizontal and vertical videos may be recommended to users according to their screen status. When a user uses a device with a rotatable screen, the method of the embodiment of the present disclosure may be used to achieve the purpose of reducing the number of rotations and maximizing the utilization of the screen.

Figure 5:
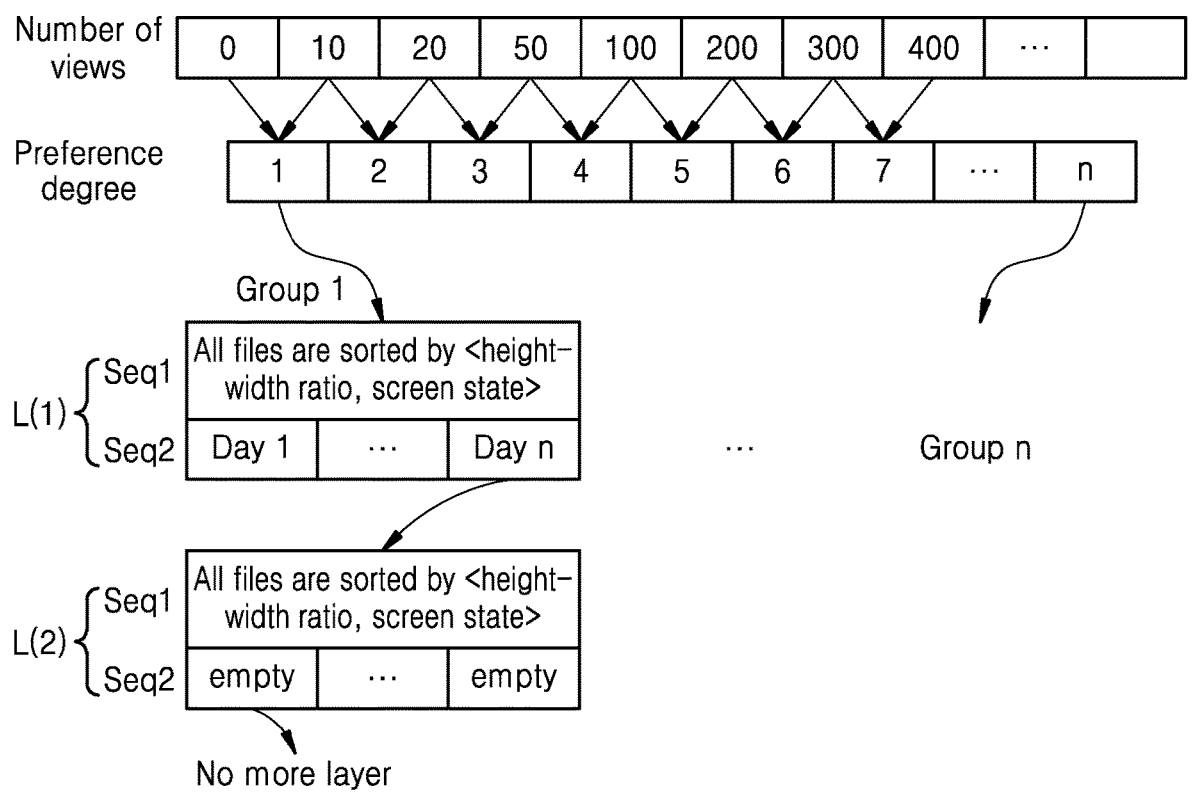
FIG. 5 is a schematic diagram illustrating file grouping in Example 2 according to various embodiments of the present disclosure.

(1) As shown in FIG. 5, file grouping may be performed in advance as described in further detail in reference to operations S1 through S4.

Operation S1 may include determining a video range recommended to a user according to user characteristic data.

Operation S2 may include establishing a corresponding relationship between the number of views and preference degree. For example, if the number of views is within the range of [0, 10], the corresponding preference degree is 1.

Operation S3 may include, within the video range, sorting files of the same preference degree according to the height-width ratio type to obtain a primary candidate sequence set corresponding to each preference degree.

Operation S4 may include, if or when there is an embedded classification (e.g., time) for files of the same preference degree, grouping the files of the same preference degree according to time (e.g., by days), and obtaining a primary candidate sequence set corresponding to each day of the same preference degree.

Operation S5 may include, for each preference degree, based on the primary candidate sequence set of each day of the preference degree, obtaining a first advanced candidate sequence set (e.g., Seq 2) of the preference degree in the order of time from near to far.

Figure 6:
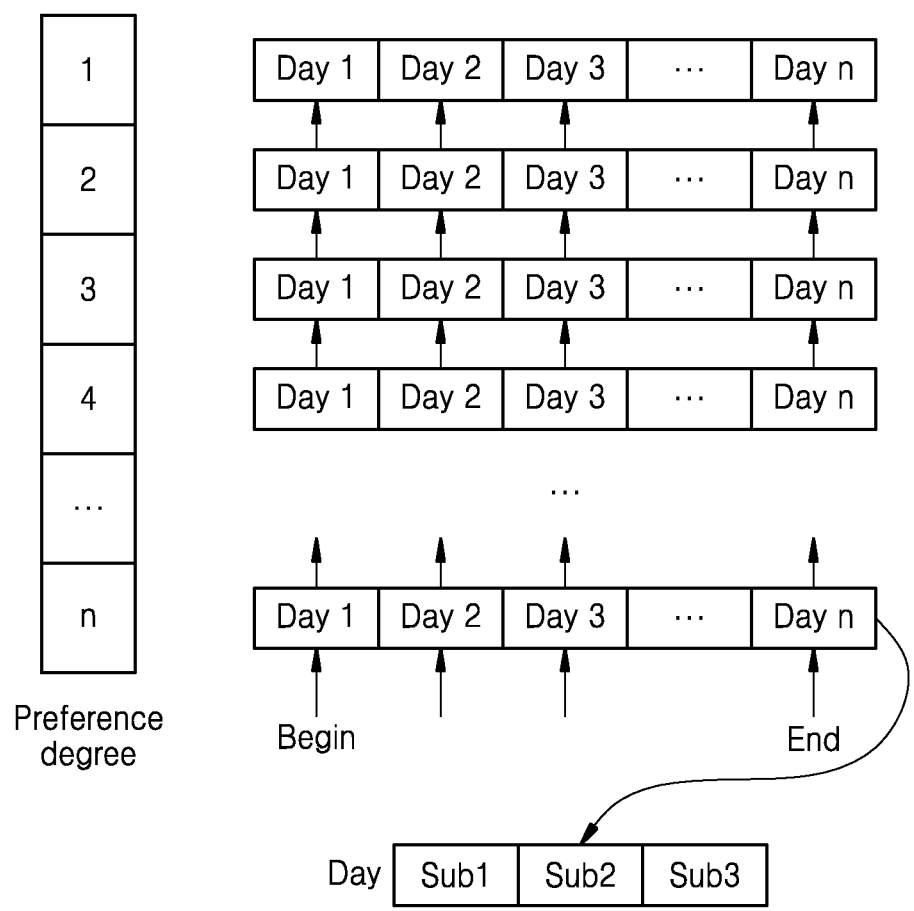
FIG. 6 is a schematic diagram illustrating generation of recommendation sequence in Example 2 according to various embodiments of the present disclosure.

(2) As shown in FIG. 6, videos may be recommended to users based on the above file grouping processing results as described in further detail in reference to operations d1 and d2.

Operation d1 may include constructing a recommendation sequence in the order of time from near to far, for example, for each day in the specified time range. The operation d1 may further include obtaining the groups of all preference degrees on that day. The operation d1 may further include based on the primary candidate sequence sets corresponding to these groups, generating the first advanced candidate sequence set corresponding to that day by adopting the multi-grouping sorting mode in the order of preference degree from high to low.

Operation d2 may include, based on the first advanced candidate sequence set of each day obtained in operation d1 and the current screen state of the user device, determining a recommendation sequence corresponding to respective day. Operation d2 may further include, based on the recommendation sequence, performing video recommendation in order of time from near to far.

Figure 7:
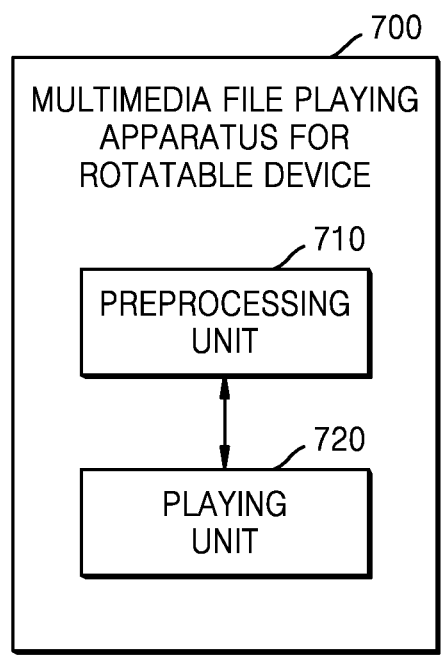
FIG. 7 is a schematic diagram illustrating structure of an apparatus according to various embodiments of the present disclosure.

FIG. 7 is a schematic diagram illustrating the structure of a multimedia file playing apparatus 700 for a rotatable device, according to various embodiments of the present disclosure. As shown in FIG. 7, the multimedia file playing apparatus 700 comprises a preprocessing unit 710 and a playing unit 720.

The preprocessing unit 710 is configured to group files in a multimedia file library in a level-by-level grouping manner based on a specified grouping parameter sequence in advance, and to generate a sub file sequence of each height-width ratio type in each group of files. The height-width ratio types include a horizontal screen, a vertical screen, and a square screen. In some embodiments, different parameters in the grouping parameter sequence correspond to different grouping granularities.

The playing unit 720 is configured to, when a file playing instruction is received, according to the file playing instruction, to generate and play a file playing sequence based on the sub file sequence of the corresponding group in the multimedia file library and the principle of minimum number of device rotations.

As the device embodiments of the present disclosure and the method embodiments of the present disclosure are realized based on the same inventive concept and their principles of solving problems are similar, the implementation of the technical features in the above-mentioned units is similar in many respects as that in the above-mentioned method embodiments, and is not be repeated here for brevity.

Based on the embodiments of the multimedia file playing method for the rotatable device, embodiments of the present disclosure realize a multimedia file playing electronic device for a rotatable device, which comprises a processor and a memory, wherein the memory stores an application program executable by the processor for causing the processor to execute the multimedia file playing method for the rotatable device as described above. Specifically, a system or device may be provided with a storage medium on which software program codes for realizing the functions of any one of the above embodiments are stored, and a computer (or CPU or MPU) of the system or device may read out and execute the program codes stored in the storage medium. In addition, part or all of the actual operations can be completed by an operating system operated on the computer based on instructions of the program codes. The program codes read from the storage medium can also be written into a memory arranged in an expansion board inserted into the computer or into a memory arranged in an expansion unit connected with the computer, and then part or all of the actual operations can be executed by a CPU installed on the expansion board or expansion unit based on the instructions of the program codes, thereby realizing the functions of any one of the above embodiments of the multimedia file playing method for the rotatable device.

The memory may be embodied as various storage media such as electrically erasable programmable read only memory (EEPROM), flash memory, and programmable program read only memory (PROM). The processor may be implemented to comprise one or more central processing units or one or more field programmable gate arrays, wherein the field programmable gate arrays integrate one or more central processing unit cores. Particularly, the central processing unit or the central processing unit core may be implemented as a CPU or MCU.

Embodiments of the present disclosure realize a computer program product, which comprises a computer program/instruction, and when the computer program/instruction is executed by a processor, the steps of the multimedia file playing method for the rotatable device as described above are realized.

It should be noted that not all steps and modules in the above-mentioned processes and structural diagrams are necessary, and some steps or modules can be omitted according to actual needs. The execution order of the steps is not fixed and can be adjusted as needed. The division of the modules is only to facilitate the description of different functions. In actual implementation, one module can be implemented as multiple modules, the functions of multiple modules can also be realized by one module, and the modules can be located in the same device or different devices.

Hardware modules in various embodiments can be implemented by a mechanical or electronic means. For example, a hardware module may comprise specially designed permanent circuits or logic devices (such as special-purpose processors, like FPGA or ASIC) for performing specific operations. The hardware module may also comprise programmable logic devices or circuits (such as general purpose processors or other programmable processors) temporarily configured by software for performing specific operations. Whether to implement the hardware modules by a mechanical means, a special permanent circuit or a temporarily configured circuit (such as configured by software) can be decided by taking consideration of cost and time.

Herein, "schematic" means "serving as an instance, example or explanation", and any diagram or embodiment described as "schematic" herein should not be interpreted as a more preferred or advantageous technical solution. For the sake of conciseness, only the parts related to the present disclosure are schematically shown in each drawing, and they do not represent the actual structure of the product. In addition, in order to make the drawings simple and easy to understand, in some figures, only one of the components with the same structure or function is shown schematically, or only one of them is marked. Herein, "one" does not mean to limit the number of relevant parts of the present disclosure to "only one", and "one" does not mean to exclude the situation that the number of relevant parts of the present disclosure is "more than one". Herein, "upper", "lower", "front", "rear", "left", "right", "inner", "outer" and so on are only used to express the relative positional relationship among related parts, but not to limit the absolute positions of these related parts.

The above are only preferred embodiments of the present disclosure and are not intended to limit the scope of protection of the present disclosure. Any modification, equivalent substitution and improvement made within the spirit and principles of the present disclosure shall be included in the scope of protection of the present disclosure.

In view of the above-described problems with related rotatable screen devices, a purpose of the present disclosure is to provide a multimedia file playing method and apparatus, which may avoid frequent screen rotation and may improve playing efficiency.

In order to achieve the above purpose, the embodiments of the present disclosure adopt the following technical solutions.

According to an aspect of the disclosure, there is provided a multimedia file playing method for a rotatable device, the method includes grouping, in a level-by-level grouping manner and based on a specified grouping parameter sequence, files in a multimedia file library, to obtain a plurality of groups of files. Different parameters in the specified grouping parameter sequence correspond to different grouping granularities. The method further includes generating a sub file sequence for each height-width ratio type in each group of the plurality of groups of files. The height-width ratio type include a horizontal screen type, a vertical screen type, and asquare screen type. The method further includes generating and playing a file playing sequence, according to a received file playing instruction, and based on sub file sequences of a corresponding group of the plurality of groups of files and a minimum number of device rotations.

In some embodiments, the specified grouping parameter sequence is generated based on an ascending order of grouping granularities. In other embodiments, the generating of the sub file sequence for each height-width ratio type includes traversing each grouping parameter in the specified grouping parameter sequence in turn, and grouping the files in the multimedia file library based on grouping parameters in the specified grouping parameter sequence. The grouping of the files includes, in response to determining that the grouping parameter is a level 1 grouping parameter, grouping the files in the multimedia file library according to the level 1 grouping parameter to obtain one or more level 1 groups of files, and, for each level 1 group in the one or more level 1 groups of files, classifying first files in that level 1 group according to the height-width ratio types of the first files, sorting the files according to the height-width ratio types of the first files, and obtaining the sub file sequence of each height-width ratio type based on the sorting. The grouping of the files further includes, in response to determining that the grouping parameter is a level n grouping parameter, grouping level n−1 groups based on the grouping parameter to obtain level n groups, and, for each level n group, based on the sub file sequences of the level n−1 groups in the level n group, obtaining the sub file sequence for respective height-width ratio type of that level n group by concatenating sub file sequences of a same height-width ratio type.

In some embodiments, the method further comprises sorting sub file sequences of each group of the plurality of groups of files, according to a preset sub-sequence sorting mode, to obtain a primary candidate sequence set corresponding to that group of the plurality of groups of files. The method further comprises, for each level n group, generating a first advanced candidate sequence in each screen state for that level n group, according to the minimum number of device rotations, and based on the primary candidate sequence sets of the level n−1 groups in the group, wherein n is an integer greater than 1. The method further includes, for each level 2 group, taking the level 1 groups in that level 2 group as target sorting groups for multi-group sorting, obtaining a prioritized play sequence for each screen state for that level 2 group, according to a preset multi-group sorting mode based on the sub file sequences of the target sorting groups, and taking the prioritized play sequence as a second advanced candidate sequence for a corresponding screen state for that level 2 group. The method further includes, for each level k group, generating the second advanced candidate sequence for each screen state for that level k group, according to the minimum number of device rotations, and based on the second advanced candidate sequences of the level k−1 groups in that level k group, wherein k is an integer greater than 2.

In some embodiments, the sorting of the sub file sequences of each group of the plurality of groups of files, according to the preset sub-sequence sorting mode includes, when a group of the plurality of groups of files includes three sub file sequences, after full permutation of a square screen sub file sequence and a horizontal screen sub file sequence in the group, concatenating each full permutation result with a vertical screen state sequence in the group to obtain horizontal screen state sequences in the primary candidate sequence set of the group, and after full permutation of a vertical screen sub file sequence and the square screen sub file sequence in the group, concatenating each full permutation result with the horizontal screen state sequence in the group to obtain vertical screen state sequences in the primary candidate sequence set of the group. The sorting of the sub file sequences of each group of the plurality of groups of files, according to the preset sub-sequence sorting mode further includes, when the group of the plurality of groups of files contains two sub file sequences, performing full permutation on the two sub file sequences to obtain a horizontal screen state sequence or a vertical screen state sequence in the primary candidate sequence set of the group, wherein when the group contains the square screen sub file sequence, a screen state corresponding to each full permutation result is the height-width ratio type of a non-square screen sub file sequence, otherwise, the screen state corresponding to each full permutation result is the height-width ratio type of a first sub file sequence. The sorting of the sub file sequences of each group of the plurality of groups of files, according to the preset sub-sequence sorting mode further includes, when the group contains a single sub file sequence, taking the sub file sequence as a unique sequence member in the primary candidate sequence set of the group, wherein when the sequence in the primary candidate sequence set is the square screen sub file sequence, the sequence belongs to both the horizontal screen state sequence and the vertical screen state sequence, otherwise, the screen state corresponding to the sequence is the height-width ratio type of sub file sequence.

In some embodiments, the generating of the first advanced candidate sequence includes, for each screen state, taking that screen state as a current screen state, traversing the level n−1 groups in that level n group, and for each level n−1 group being traversed, selecting a sequence matching the current screen state from the primary candidate sequence set of the level n−1 group, determining a screen state after the selected sequence is played in the current screen state, updating the current screen state to a currently determined screen state, and sequentially concatenating the selected sequences to obtain the first advanced candidate sequence in the screen state for that level n group.

In some embodiments, the generating of the second advanced candidate sequence include, for each screen state, taking that screen state as a current screen state, traversing the level k−1 groups in that level k group, and for each level k−1 group being traversed, selecting a sequence matching the current screen state from the second advanced candidate sequences of the level k−1 group, determining a screen state after the selected sequence is played in the current screen state, updating the current screen state to a currently determined screen state, and sequentially concatenating all the selected sequences to obtain the second advanced candidate sequence for the screen state for that level k group.

In some embodiments, the generating of the file playing sequence includes, when the received file playing instruction does not contain a playing sequence condition related to grouping parameters in the specified grouping parameter sequence, generating, based on the sub file sequences of a level $n_{max}$ and lower level groups in a file playing range indicated by the received file playing instruction, sub file sequences corresponding to the file playing range in a manner of concatenating sub file sequences of a same height-width ratio type, and sorting the generated sub file sequences in a manner that the sub file sequence whose height-width ratio type matches a current screen state is preferentially placed in the front of the sequence to obtain the file playing sequence, wherein the level $n_{max}$ is a highest grouping level corresponding to a complete group contained in the file playing range. The generating of the file playing sequence further includes, when the received file playing instruction contains the playing sequence condition related to the grouping parameters, generating, based on the sub file sequences of a level $n_{min}$ and lower level groups in the file playing range, the file playing sequence with a minimum number of device rotations in the current screen state according to the preset multi-group sorting mode, wherein the level $n_{min}$ is the lowest grouping level corresponding to the grouping parameter indicated by the playing sequence condition.

In some embodiments, the generating of the file playing sequence includes, when the received file playing instruction does not contain a playing sequence condition related to grouping parameters in the specified grouping parameter sequence, generating, based on the sub file sequences of a level $n_{max}$ and lower level groups in a file playing range indicated by the received file playing instruction, sub file sequences corresponding to the file playing range in a manner of concatenating sub file sequences of a same height-width ratio type, and sorting the generated sub file sequences in a manner that the sub file sequence whose height-width ratio type matches a current screen state is preferentially placed in the front of the sequence to obtain the file playing sequence, wherein the level $n_{max}$ is a highest grouping level corresponding to a complete group contained in the file playing range. The generating of the file playing sequence further includes, when the received file playing instruction contains the playing sequence condition related to the grouping parameters, determining a lowest group level $n_{min}$ corresponding to the grouping parameter indicated by the playing sequence condition. The generating of the file playing sequence further includes, when the lowest group level $n_{min}$ is equal to 1, searching for a highest group level $n_{z,max}$ at which the file playing range is composed of complete same-level groups, when the search is successful and $n_{z,max}$ is greater than 1, generating a file playing sequence in the current screen state according to the minimum number of device rotations based on the second advanced candidate sequences of level $n_{z,min}$ groups in the file playing range, otherwise, taking the level 1 groups in the file playing range as target sorting groups of multi-grouping sorting, obtaining a prioritized playing sequence for each screen state based on the sub file sequences of the target sorting groups according to a multi-grouping sorting mode, and taking the prioritized playing sequence matching the current screen state as the file playing sequence. The generating of the file playing sequence further includes, when $n_{min}$ is greater than 1, determining whether the file playing range is composed of complete level $n_{min}+1$ groups, based on determining that the file playing range is composed of the complete level $n_{min}$+1 groups, generating a file playing sequence for the current screen state based on the first advanced candidate sequences of the level $n_{min}$+1 groups in the file playing range according to the minimum number of device rotations, otherwise, generating the file playing sequence with a minimum number of device rotations for the current screen state based on the sub file sequences of the level $n_{min}$ and lower level groups in the file playing range according to the multi-grouping sorting mode.

In some embodiments, the multi-grouping sorting mode includes, for each target sorting group of the multi-grouping sorting, sorting the sub file sequences of the target sorting group according to the preset sub-sequence sorting mode to obtain a primary candidate sequence set of the target sorting group. The multi-grouping sorting mode further includes constructing a sequence relation network based on the primary candidate sequence sets of the target sorting groups. A node in the sequence relation network represents a sequence in the primary candidate sequence set. A weight of the node is the number of device rotations required when playing the sequence to which the node belongs. Each node is connected with the nodes of adjacent target sorting groups of the target sorting group to which the node belongs. A path weight between adjacent nodes represents the number of device rotations required for switching between corresponding sequences. The multi-grouping sorting mode further includes traversing each sequence in the primary candidate sequence set of the target sorting group with a smallest sequence index, and selecting a path with a smallest total path weight as a superior path corresponding to the sequence from paths in the sequence relation network starting from the sequence and ending at nodes of the target sorting group with a largest sequence index. A total path weight is a sum of weights of the nodes in the path and the node paths. The multi-grouping sorting mode further includes, based on the superior path, determining a path with the minimum number of device rotations in each screen state, and obtaining a prioritized playing sequence in the corresponding screen state.

In some embodiments, the generating of the sub file sequences corresponding to the file playing range includes, when there exists an incomplete level $n_{max}$ group in the file playing range, for each incomplete level $n_{max}$ group, based on sub file sequences of level $n_{max-i}$ groups in the level $n_{max}$ group in the file playing range, generating the sub file sequences corresponding to the level $n_{max}$ group in the file playing range in the manner of concatenating sub file sequences of the same type, wherein $n_{max-i}$ is a highest group level at which the incomplete level $n_{max}$ group is composed of complete same-level groups. The generating of the sub file sequences corresponding to the file playing range further includes, based on the sub file sequences of level $n_{max}$ groups in the file playing range, generating the sub file sequence for each height-width ratio type in the file playing range in the manner of concatenating the sub file sequences of the same type.

In some embodiments, the generating of the file playing sequence includes, when there exists an incomplete level $n_{min}$ group in the file playing range, for each incomplete level $n_{min}$ group, based on the sub file sequences of the level $n_{max-i}$ groups contained by the level $n_{min}$ group in the file playing range, generating the sub file sequences corresponding to the level $n_{min}$ group in the file playing range in the manner of concatenating the sub file sequences of the same type, wherein $n_{max-i}$ is a highest group level at which the incomplete level $n_{min}$ group is composed of complete same-level groups. The generating of the file playing sequence includes, taking level $n_{min}$ groups in the file playing range as target sorting groups of multi-grouping sorting, obtaining the prioritized playing sequence in each screen state based on the sub file sequences of the target sorting groups according to the multi-grouping sorting mode, and taking the prioritized playing sequence matching the current screen state as the file playing sequence.

In some embodiments, the generating of the file playing sequence in the current screen state includes traversing the level $n_{z,max}$ groups in the file playing range, for each level $n_{z,max}$ group being traversed, selecting a sequence matching the current screen state from the second advanced candidate sequences of the level $n_{z,max}$ group, determining a screen state after playing the selected sequence in the current screen state, and updating the current screen state to the currently determined screen state. The generating of the file playing sequence in the current screen state further includes sequentially concatenating the selected sequences to obtain the file playing sequence.

In some embodiments, the generating of the file playing sequence in the current screen state includes traversing the level $n_{min}$+1 groups in the file playing sequence, for each level $n_{min}$+1 group being traversed, selecting a sequence matching the current screen state from the primary advanced candidate sequences of the level $n_{min}$+1 group, determining a screen state after playing the selected sequence in the current screen state, and updating the current screen state to a currently determined screen state. The generating of the file playing sequence in the current screen state further includes sequentially concatenating the selected sequences to obtain the file playing sequence.

According to another aspect of the disclosure, there is provided a multimedia file playing apparatus for a rotatable device that includes a preprocessing unit and a playing unit.

In some embodiments, the preprocessing unit is configured to group files in a multimedia file library in a level-by-level grouping manner based on a specified grouping parameter sequence, and to generate a sub file sequence for each height-width ratio type for each group based on each group of files, wherein the height-width ratio type include horizontal screen, vertical screen and square screen, and different parameters in the specified grouping parameter sequence correspond to different grouping granularities; and In some embodiments, the playing unit is configured to generate and play a file playing sequence, when a file playing instruction is received, according to the file playing instruction based on the sub file sequences of a corresponding group in the multimedia file library and a minimum number of device rotations.

According to another aspect of the disclosure, there is provided a non-transitory computer readable storage medium, wherein the non-transitory computer readable storage medium stores instructions, when executed by a processor, cause the processor to execute the steps of the multimedia file playing method for the rotatable device as described above.

According to another aspect of the disclosure, there is provided an electronic device, comprising the non-transitory computer readable storage medium and a processor capable of accessing the non-transitory computer readable storage medium.

According to the multimedia file playing solution for the rotatable device provided by the embodiments of the present disclosure, the files in the multimedia file library are grouped based on different granularities by adopting the level-by-level grouping method in advance, and the sub file sequences of each height-width ratio type (including horizontal screen, vertical screen and square screen) in the corresponding group are generated for each group of files, so that when the file playing instruction is received, the file playing sequence is generated and played based on the sub file sequences of the corresponding group in the multimedia file library and the principle of minimum number of device rotations. In this way, the file playing sequence with a minimum number of device rotations may be used to avoid the problem of frequent screen rotations during playing. As a result, the efficiency of generating the file playing sequence based on the file playing instruction may be improved using the sub file sequences of each group generated level by level in advance.

The invention claimed is:

1. A multimedia file playing method for a rotatable device, comprising:
   grouping, based on a specified grouping parameter sequence, files in a multimedia file library, to obtain a plurality of groups of files having one or more levels, wherein different parameters in the specified grouping parameter sequence correspond to different grouping granularities;
   generating a sub file sequence for each height-width ratio type in each group of the plurality of groups of files, wherein the height-width ratio type comprises a horizontal screen type, a vertical screen type, and a square screen type;
   generating and playing a file playing sequence, according to a received file playing instruction, that has been sorted using a sequence relation network constructed based on sub file sequences of a corresponding group of the plurality of groups of files in the multimedia file library within a file playing range and a minimum number of device rotations; and
   sorting sub file sequences of each group of the plurality of groups of files, according to a preset sub-sequence sorting mode, to obtain a primary candidate sequence set corresponding to that group of the plurality of groups of files,
   wherein a node in the sequence relation network represents a sequence in the primary candidate sequence set,
   wherein a weight of the node indicates a number of device rotations required when playing the sequence represented by the node, and
   wherein, based on the received file playing instruction not containing a playing sequence condition related to grouping parameters in the specified grouping parameter sequence, the generating and playing of the file playing sequence comprises:
      generating sub file sequences corresponding to the file playing range by concatenating sub file sequences of a same height-width ratio type; and
      generating the file playing sequence such that a matching sub file sequence whose height-width ratio type matches a current screen state is preferentially placed in the front of the file playing sequence.

2. The multimedia file playing method according to claim 1, wherein:
   the specified grouping parameter sequence is generated based on an ascending order of grouping granularities; and
   the generating of the sub file sequence for each height-width ratio type comprises traversing each grouping parameter in the specified grouping parameter sequence in turn, and grouping the files in the multimedia file library based on the grouping parameters in the specified grouping parameter sequence, wherein the grouping of the files comprises:
   in response to determining that the grouping parameter is a level 1 grouping parameter:
      grouping the files in the multimedia file library according to the level 1 grouping parameter to obtain one or more level 1 groups of files; and
      for each level 1 group in the one or more level 1 groups of files, classifying first files in that level 1 group according to height-width ratio types of the first files, sorting the first files according to the height-width ratio types of the first files, and obtaining the sub file sequence of each height-width ratio type based on the sorting; and
   in response to determining that the grouping parameter is a level n grouping parameter:
      grouping level n−1 groups based on the grouping parameter to obtain level n groups, wherein n is an integer greater than 1; and
      for each level n group, based on sub file sequences of the level n−1 groups in the level n group, obtaining the sub file sequence for respective height-width ratio type of that level n group by concatenating sub file sequences of a same height-width ratio type.

3. The multimedia file playing method according to claim 1, further comprising:
   for each level n group, generating a first advanced candidate sequence in each screen state for that level n group, according to the minimum number of device rotations, and based on the primary candidate sequence sets of level n−1 groups in the level n group, wherein n is an integer greater than 1;
   for each level 2 group, taking the level 1 groups in that level 2 group as target sorting groups for multi-group sorting, obtaining a prioritized play sequence for each screen state for that level 2 group, according to a preset multi-group sorting mode based on the sub file sequences of the target sorting groups, and taking the prioritized play sequence as a second advanced candidate sequence for a corresponding screen state for that level 2 group; and
   for each level k group, generating a second advanced candidate sequence for each screen state for the level k group, according to the minimum number of device rotations, and based on the second advanced candidate sequences of level k−1 groups in the level k group, wherein k is an integer greater than 2.

4. The multimedia file playing method according to claim 3, wherein the sorting of the sub file sequences of each group of the plurality of groups of files, according to the preset sub-sequence sorting mode, comprises:
   based on a first group of the plurality of groups of files comprising three sub file sequences, after full permutation of a square screen sub file sequence and a horizontal screen sub file sequence in the first group, concatenating each full permutation result with a vertical screen state sequence in the first group to obtain horizontal screen state sequences in the primary candidate sequence set of the first group, and after full permutation of a vertical screen sub file sequence and the square screen sub file sequence in the first group, concatenating each full permutation result with a first horizontal screen state sequence in the first group to obtain vertical screen state sequences in the primary candidate sequence set of the first group;
   based on a second group of the plurality of groups of files comprising two sub file sequences, performing full permutation on the two sub file sequences to obtain a horizontal screen state sequence or a vertical screen state sequence in the primary candidate sequence set of the second group, wherein, based on the second group containing the square screen sub file sequence, a screen state corresponding to each full permutation result is the height-width ratio type of a non-square screen sub file sequence, wherein, based on the second not containing the square screen sub file sequence, the screen state corresponding to each full permutation result is the height-width ratio type of a first sub file sequence; and based on a third group of the plurality of groups of files comprising a single sub file sequence, taking the sub file sequence as a unique sequence member in the primary candidate sequence set of the third group, wherein, based on the sequence in the primary candidate sequence set being the square screen sub file sequence, the sequence belongs to both the horizontal screen state sequence and the vertical screen state sequence, and wherein, based on the sequence in the primary candidate sequence set not being the square screen sub file sequence, the screen state corresponding to the sequence is a height-width ratio type of sub file sequence.

5. The multimedia file playing method according to claim 3, wherein the generating of the first advanced candidate sequence comprises:

for each screen state, taking that screen state as the current screen state, traversing the level n−1 groups in that level n group, and for each level n−1 group being traversed, selecting a sequence matching the current screen state from the primary candidate sequence set of the level n−1 group, determining a screen state after the selected sequence is played in the current screen state, updating the current screen state to a currently determined screen state, and sequentially concatenating the selected sequences to obtain the first advanced candidate sequence in the screen state for that level n group.

6. The multimedia file playing method according to claim 3, wherein the generating of the second advanced candidate sequence comprises:

for each screen state, taking that screen state as the current screen state, traversing the level k−1 groups in the level k group, and for each level k−1 group being traversed, selecting a sequence matching the current screen state from the second advanced candidate sequences of the level k−1 group, determining a screen state after the selected sequence is played in the current screen state, updating the current screen state to a currently determined screen state, and sequentially concatenating the selected sequences to obtain the second advanced candidate sequence for the screen state for the level k group.

7. The multimedia file playing method according to claim 1, wherein the generating of the file playing sequence comprises:

based on the received file playing instruction not containing a playing sequence condition related to the grouping parameters in the specified grouping parameter sequence, generating, based on the sub file sequences of a level $n_{max}$ and and lower level groups in the file playing range indicated by the received file playing instruction, sub file sequences corresponding to the file playing range by concatenating sub file sequences of a same height-width ratio type, and sorting the generated sub file sequences such that a sub file sequence whose height-width ratio type matches the current screen state is preferentially placed in the front of the sequence to obtain the file playing sequence, wherein the level $n_{max}$ is a highest grouping level corresponding to a complete group contained in the file playing range; and based on the received file playing instruction containing the playing sequence condition related to the grouping parameters, generating, based on the sub file sequences of a level $n_{min}$ and lower level groups in the file playing range, the file playing sequence with the minimum number of device rotations in the current screen state according to a preset multi-group sorting mode, wherein the level $n_{min}$ is a lowest grouping level corresponding to a grouping parameter indicated by the playing sequence condition.

8. The multimedia file playing method according to claim 3, wherein the generating of the file playing sequence comprises:

based on the received file playing instruction not containing a playing sequence condition related to the grouping parameters in the specified grouping parameter sequence, generating, based on the sub file sequences of a level $n_{max}$ and lower level groups in the file playing range indicated by the received file playing instruction, sub file sequences corresponding to the file playing range by concatenating sub file sequences of a same height-width ratio type, and sorting the generated sub file sequences such that a sub file sequence whose height-width ratio type matches the current screen state is preferentially placed in the front of the sequence to obtain the file playing sequence, wherein the level $n_{max}$ is a highest grouping level corresponding to a complete group contained in the file playing range; and based on the received file playing instruction containing the playing sequence condition related to the grouping parameters, determining a lowest group level $n_{min}$ corresponding to a grouping parameter indicated by the playing sequence condition;

based on the lowest group level $n_{min}$ being equal to 1, searching for a highest group level $n_{z,max}$ at which the file playing range is composed of complete same-level groups, based on the searching being successful and $n_{z,max}$ being greater than 1, generating the file playing sequence in the current screen state according to the minimum number of device rotations based on the second advanced candidate sequences of level $n_{z,max}$ groups in the file playing range, based on the searching not being successful or $n_{z,max}$ being less than or equal to 1, taking the level 1 groups in the file playing range as the target sorting groups of the multi-grouping sorting, obtaining a prioritized playing sequence for each screen state based on the sub file sequences of the target sorting groups according to a multi-grouping sorting mode, and taking the prioritized playing sequence matching the current screen state as the file playing sequence; and based on the lowest group level $n_{min}$ being greater than 1, determining whether the file playing range is composed of complete level $n_{min}+1$ groups, based on determining that the file playing range is composed of the complete level $n_{min}+1$ groups, generating the file playing sequence for the current screen state based on first advanced candidate sequences of the level $n_{min}+1$ groups in the file playing range according to the minimum number of device rotations, based on the lowest group level $n_{min}$ being less than or equal to 1, generating the file playing sequence with the minimum number of device rotations for the current screen state based on the sub file sequences of the level $n_{min}$ and lower level groups in the file playing range according to the multi-grouping sorting mode.

9. The multimedia file playing method according to claim 8, wherein the multi-grouping sorting mode comprises:
for each target sorting group of the multi-grouping sorting, sorting the sub file sequences of the target sorting group according to the preset sub-sequence sorting mode to obtain a primary candidate sequence set of the target sorting group;
constructing the sequence relation network based on the primary candidate sequence sets of the target sorting groups, wherein at least one node in the sequence relation network represents a sequence in the primary candidate sequence set, a weight of the at least one node is a number of device rotations required when playing the sequence to which the at least one node belongs, each node is connected with the nodes of adjacent target sorting groups of the target sorting group to which the node belongs, and a path weight between adjacent nodes represents the number of device rotations required for switching between corresponding sequences;
traversing each sequence in the primary candidate sequence set of the target sorting group with a smallest sequence index, and selecting a path with a smallest total path weight as a superior path corresponding to the sequence from paths in the sequence relation network starting from the sequence and ending at nodes of the target sorting group with a largest sequence index, wherein a total path weight is a sum of weights of the nodes in the path and the node paths; and
based on the superior path, determining a path with the minimum number of device rotations in each screen state, and obtaining a prioritized playing sequence in the corresponding screen state.

10. The multimedia file playing method according to claim 7, wherein the generating of the sub file sequences corresponding to the file playing range comprises:
based on an incomplete level $n_{max}$ group existing in the file playing range, for each incomplete level $n_{max}$ group, based on sub file sequences of level $n_{max-i}$ groups in the level $n_{max}$ group in the file playing range, generating the sub file sequences corresponding to the level n_max group in the file playing range by concatenating sub file sequences of the same type, wherein $n_{max-i}$ is a highest group level at which the incomplete level $n_{max}$ group is composed of complete same-level groups; and
based on the sub file sequences of level $n_{max}$ groups in the file playing range, generating the sub file sequence for each height-width ratio type in the file playing range by concatenating the sub file sequences of the same type.

11. The multimedia file playing method according to claim 7, wherein the generating of the file playing sequence further comprises:
based on an incomplete level $n_{min}$ group existing in the file playing range, for each incomplete level $n_{min}$ group, based on the sub file sequences of the level $n_{max-i}$ groups contained by the level $n_{min}$ group in the file playing range, generating the sub file sequences corresponding to the level $n_{min}$ group in the file playing range by concatenating the sub file sequences of the same type, wherein $n_{max-i}$ is a highest group level at which the incomplete level $n_{min}$ group is composed of complete same-level groups; and taking level $n_{min}$ groups in the file playing range as target sorting groups of multi-grouping sorting, obtaining a prioritized playing sequence in each screen state based on the sub file sequences of the target sorting groups according to a multi-grouping sorting mode, and taking the prioritized playing sequence matching the current screen state as the file playing sequence.

12. The multimedia file playing method according to claim 8, wherein the generating of the file playing sequence in the current screen state comprises:
traversing the level $n_{z,max}$ groups in the file playing range, for each level $n_{z,max}$ group being traversed, selecting a sequence matching the current screen state from the second advanced candidate sequences of the level $n_{z,max}$ group, determining a screen state after playing the selected sequence in the current screen state, and updating the current screen state to a currently determined screen state; and
sequentially concatenating the selected sequences to obtain the file playing sequence.

13. The multimedia file playing method according to claim 8, wherein the generating of the file playing sequence in the current screen state comprises:
traversing the level $n_{min}+1$ groups in the file playing sequence, for each level $n_{min}+1$ group being traversed, selecting a sequence matching the current screen state from the primary candidate sequence sets of the level $n_{min}+1$ group, determining a screen state after playing the selected sequence in the current screen state, and updating the current screen state to a currently determined screen state;
sequentially concatenating the selected sequences to obtain the file playing sequence.

14. A multimedia file playing apparatus for a rotatable device, comprising at least one processor configured to implement:
a preprocessing unit configured to group files in a multimedia file library based on a specified grouping parameter sequence to obtain a plurality of groups of files having one or more levels, generate a sub file sequence for each height-width ratio type for each group of the plurality of groups of files, wherein the height-width ratio type comprises a horizontal screen type, a vertical screen type and a square screen type, and different parameters in the specified grouping parameter sequence correspond to different grouping granularities, and sort sub file sequences of each group of the plurality of groups of files, according to a preset sub-sequence sorting mode, to obtain a primary candidate sequence set corresponding to that group of the plurality of groups of files; and
a playing unit configured to generate and play a file playing sequence according to a file playing instruction, that has been sorted using a sequence relation network constructed based on sub file sequences of a corresponding group in the multimedia file library within a file playing range and a minimum number of device rotations,
wherein a node in the sequence relation network represents a sequence in the primary candidate sequence set,
wherein a weight of the node indicates a number of device rotations required when playing the sequence represented by the node, and
wherein the playing unit is further configured to:
generate sub file sequences corresponding to the file playing range by concatenating sub file sequences of a same height-width ratio type; and generate the file playing sequence such that a matching sub file sequence whose height-width ratio type matches a current screen state is preferentially placed in the front of the file playing sequence.

15. A non-transitory computer readable storage medium, wherein the non-transitory computer readable storage medium stores instructions, when executed by a processor, cause the processor to execute the multimedia file playing method for the rotatable device according to claim 1.

16. An electronic device, comprising the non-transitory computer readable storage medium according to claim 15 and a processor capable of accessing the non-transitory computer readable storage medium.

* * * * *